United States Patent
Aoyama et al.

(10) Patent No.: US 7,171,991 B2
(45) Date of Patent: Feb. 6, 2007

(54) FIXED QUANTITY SUPPLY EQUIPMENT FOR INFLATORS

(75) Inventors: Keishi Aoyama, Hyogo (JP); Yuji Nakazawa, Hyogo (JP)

(73) Assignee: Daicel Chemical Industries, Ltd., Sakai (JP)

( * ) Notice: Subject to any disclaimer, the term of this patent is extended or adjusted under 35 U.S.C. 154(b) by 470 days.

(21) Appl. No.: 10/742,870

(22) Filed: Dec. 23, 2003

(65) Prior Publication Data

US 2005/0089387 A1    Apr. 28, 2005

(30) Foreign Application Priority Data

Dec. 26, 2002   (JP)   ............................ 2002-376024
Mar. 20, 2003   (JP)   ............................ 2003-077054

(51) Int. Cl.
*B65B 1/04*    (2006.01)
(52) U.S. Cl. .......................................... 141/67; 141/82
(58) Field of Classification Search ................. 141/67, 141/82, 286, 301, 302, 98
See application file for complete search history.

(56) References Cited

FOREIGN PATENT DOCUMENTS

| EP | 1020683 A1 | 7/2000 |
|---|---|---|
| JP | 61-38134 U | 3/1986 |
| JP | 10-35893 A | 2/1998 |
| JP | 11-101422 A | 4/1999 |

*Primary Examiner*—Steven O. Douglas
(74) *Attorney, Agent, or Firm*—Birch, Stewart, Kolasch & Birch, LLP

(57) ABSTRACT

A fixed quantity supply equipment for inflators is combined with a heat-treatment equipment for inflators. A bottom portion 22 of an inflator accommodating chamber 20 at a predetermined position is opened by an opening/closing means 30 utilizing pneumatics to cause inflators 40 inside the inflator accommodating chamber to fall naturally. Thereafter, the bottom portion 22 is closed, the bottom portion 22 of the next inflator accommodating chamber 20 is opened to cause inflators 40 inside the same to fall naturally. These actions are repeated to supply the inflators 40 in a constant number.

7 Claims, 4 Drawing Sheets

FIXED QUANTITY SUPPLY EQUIPMENT FOR INFLATORS

This Nonprovisional application claims priority under 35 U.S.C. § 119(a) on Patent Application Nos. 2002-376024 and 2003-77054 filed in Japan on Dec. 26, 2002 and Mar. 20, 2003, the entire contents of which are hereby incorporated by reference.

BACKGROUND OF THE INVENTION

1. Field of the Invention

The present invention relates to a fixed quantity supply equipment for inflators which is used in combination with a heat-treatment equipment for the inflators.

2. Description of the Related Art

Recently, since new cars equipped with an air bag(s) have increased, it is anticipated that a great deal of inflators accommodating gas generating materials will be seen when scrapping these cars. Therefore, from the viewpoint of safety and effective utilization of resources, it is necessary to ignite the gas generating materials by heat-treatment to safely recover metals and the like. Under such circumstances, a recovery/treatment system for inflators for an air bag is being started.

For the treatment of inflators for an air bag, a method in which a heat-treatment to inflators for an air bag is conducted inside a heat-treating tower to ignite and burn gas generating materials accommodated in the inflators at a high temperature is adopted. Then, a combustion gas generated from the treatment of the gas generating materials is exhausted from an exhaust gas tube connected to the heat-treating tower.

When inflators which are subject to treatment are charged into the heat-treating tower, it is desirable to conduct charging by a mechanical means, because it is troublesome to conduct charging manually, which results in reduction of workability. Further, even when the mechanical means is adopted, it is desirable that a constant lot (quantity) of inflators can always be charged in order to perform a stable heat-treatment.

As conventional art, JP-A 11-101422 can be found.

SUMMARY OF THE INVENTION

The present invention provides a fixed quantity supply equipment for inflators, which is used in combination with an inflator heat-treatment equipment and that can supply a constant number of inflators by a mechanical means.

More specifically, the present invention provides a fixed quantity supply equipment for inflators, which is used for a system for charging inflators for an air bag into a heat-treating tower, for treating the inflators inside the heat-treating tower, comprising:

a rotatable supporting shaft; a plurality of inflator accommodating means which is provided at the periphery of the supporting shaft and having a part that is openable/closable; and opening/closing means that opens/closes the part of the inflator accommodating means.

By accommodating inflators, which are subject to treatment, in the inflator accommodating means and opening/closing the part of the inflator accommodating means by the opening/closing means, inflators can be supplied by a constant number.

It is preferable that the inflator accommodating means has an annular main body portion integrally mounted to a periphery of the supporting shaft and inflator accommodating chambers formed by partitioning the inside of the annular main body portion into a plurality of chambers, and bottom portions of the inflator accommodating chambers are set to be openable/closable to form inflator supplying ports.

By making the bottom portions of the inflator accommodating chambers openable/closable, the inflators fall down naturally, so that a constant number of inflators can be supplied. Further, in the case of a system where inflators fall down naturally by opening the bottom portion in this manner, since inflators can be discharged irrespective of an accommodating state of the inflators, it becomes unnecessary to particularly consider the accommodating state of inflators inside the inflator accommodating chambers, which facilitates an accommodating work of the inflators.

It is preferable that the inflator accommodating means has an annular main body portion integrally mounted to a periphery of the supporting shaft and inflator accommodating chambers obtained by partitioning the inside of the annular main body portion into the plurality of chambers, bottom portions of the inflator accommodating chambers are set to be openable/closable to form inflator supplying ports, and a part of the inflator accommodating chambers are opened to form accommodating ports for accommodating inflators.

The inflator accommodating ports may be openable/closable, but it is preferable that they are kept opened in view of workability.

It is preferable that the opening/closing means comprises a combination of mechanical and electrical means, and bottom portions of the inflator accommodating chambers are opened/closed in a single swing manner. The opening/closing means can be made by utilizing pneumatics.

It is preferable that the fixed quantity supply equipment for inflators is further attached with an inclined pipe connected to the inflator accommodating means. This inclined pipe is directly or indirectly connected to an inflator heat-treatment equipment (the heat-treating tower) combined with the fixed quantity supply equipment for inflators to form a supplying passage for inflators.

The inflators for an air bag which are subject to treatment in this invention includes all inflators required to be treated for various reasons, for example, an in-process defective product, a returned product from an automobile manufacturer or a module manufacturer, a stocked product remaining after manufacture has stopped, and an inflator removed from a scrapped car.

According to the fixed quantity supply equipment for inflators of the present invention, a desired number of inflators can be supplied in a constant number mechanically. For this reason, since heat-treatment conditions for inflators can be maintained constant, management of a treatment operation is made easy and a stable throughput can be secured.

DETAILED DESCRIPTION OF THE INVENTION

Figure 1A:
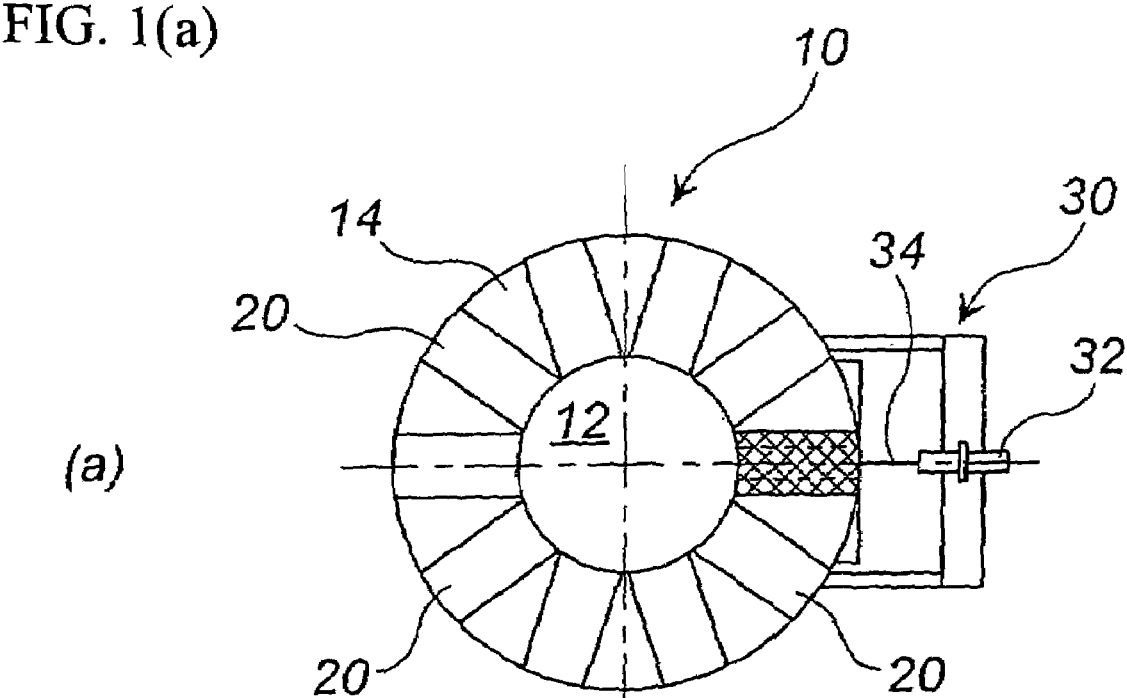
FIG. 1(a) is a schematic plan view of a fixed quantity supply equipment for inflators.
Figure 1B:
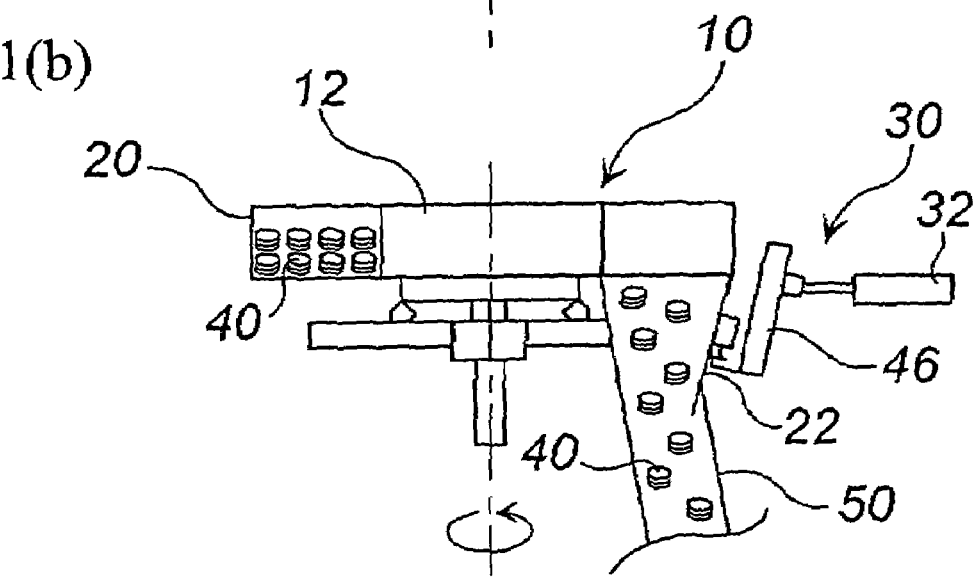
FIG. 1(b) is a front view of the apparatus in FIG. 1(a)
Figure 2:
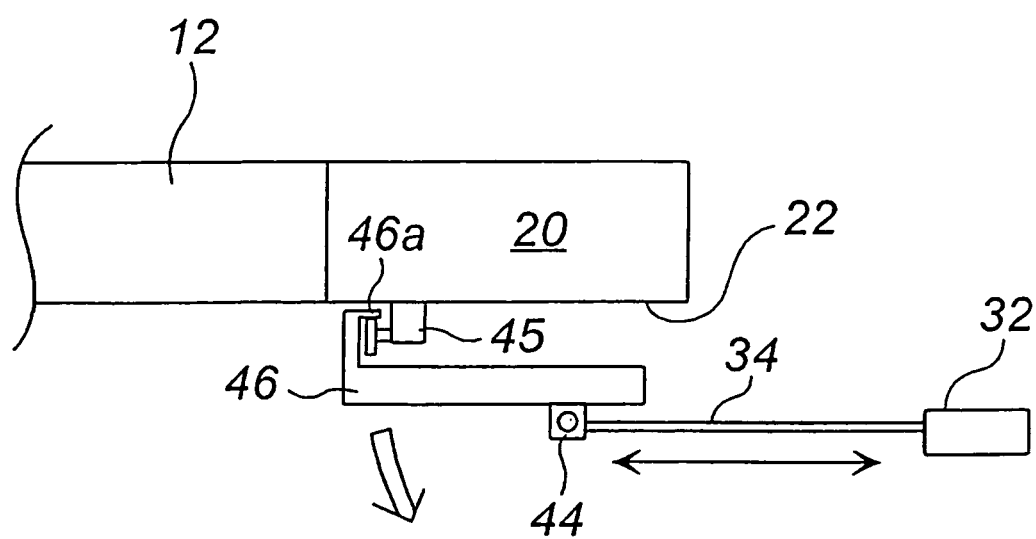
FIG. 2 is a partially enlarged view of the apparatus in FIG. 1.

Hereinafter, an embodiment of the present invention will be explained with reference to the drawings. FIG. 1(a) is a plan view of a fixed quantity supply equipment for inflators, FIG. 1(b) is a front view of the apparatus in FIG. 1(a), and FIG. 2 is a partially enlarged view of the apparatus in FIG. 1.

A fixed quantity supply equipment 10 for inflators has a rotatable supporting shaft 12 connected to an unillustrated driving apparatus, an annular main body portion 14 integrally mounted at a periphery of the supporting shaft 12, inflator accommodating chambers 20 obtained by partitioning the annular main body portion 14 into a plurality of chambers, and an opening/closing means 30. The annular main body portion 14 rotates on an annular guide rail (not shown) partially cut off.

The inflator accommodating chamber 20 has a cubic shape, and its volume is determined in relation to a size of an inflator 40 and the total number of inflators 40 to be accommodated. In FIG. 1(a), the number of inflator accommodating chambers 20 provided in the annular main body 14 is ten in total.

The total number of the inflator accommodating chambers 20 is not limited in particular, but the annular main body preferably has 5 to 15 chambers, more preferably 9 to 11 chambers, in view of the treatment efficiency of the inflators or the like.

The number of inflators supplied to one inflator accommodating chamber 20 can be properly set according to the sizes and shapes of the inflators which are subject to treatment, further, considering the treatment efficiency or the like. The inflator accommodating chamber 20 may be formed, for example, to have such a size that about 60 inflators are accommodated at most, or it can be formed larger than that.

A ceiling portion of the chamber 20 is opened to form an accommodating port for the inflators 40, and its bottom portion 22 is made openable/closable to form a constant number supplying port for the inflators 40.

The opening/closing means 30 can open/close the bottom portion 22 of the inflator accommodating chamber 20, and it can adopt one comprising a combination of a mechanical and electrical means. One aspect of the opening/closing means will be explained with reference to FIG. 2.

A piston 34 is connected to an air cylinder 32, and the piston 34 extends/retracts in the direction of both arrows according to an action of the air cylinder 32. The piston 34 is connected to a pulling tool 46 whose distal end is bent like a hook via a rotating connection portion 44. An opening/closing assistant tool 45 is mounted to the bottom surface 22 of the inflator accommodating chamber 20, and the opening/closing assistant tool 45 and the hook-like portion 46a at the distal end of the pulling tool 46 are arranged to abut against each other (they may not be in contact with each other prior to activation of the air cylinder 32).

The opening/closing system of the bottom portion 22 conducted by the opening/closing means 30 can be applied with a single swing system, a center-opening system, a slide system or the like, but it is preferable to apply the single swing system, as shown in FIG. 1(b). In the case of the single swing system, such a single swung state as shown in FIG. 1(b) can be achieved by retracting the piston 34 according to an action of the air cylinder 32 and rotating the pulling tool 46 in the direction of the arrows according to action of the rotating connection portion 44.

In FIG. 1(b), an inclined pipe 50 is connected to the inflator accommodating chamber 20, and it is connected such that, when the bottom portion 22 of the inflator accommodating chamber 20 is swung, the swung opening portion is positioned inside the inclined pipe 50.

By combining the inflator accommodating chamber 20 and the inclined pipe 50 in this manner, as shown in FIG. 1(b), the inflators 40 accommodated in the inflator accommodating chamber 20 can be supplied by a constant number due to natural falling.

Figure 3:
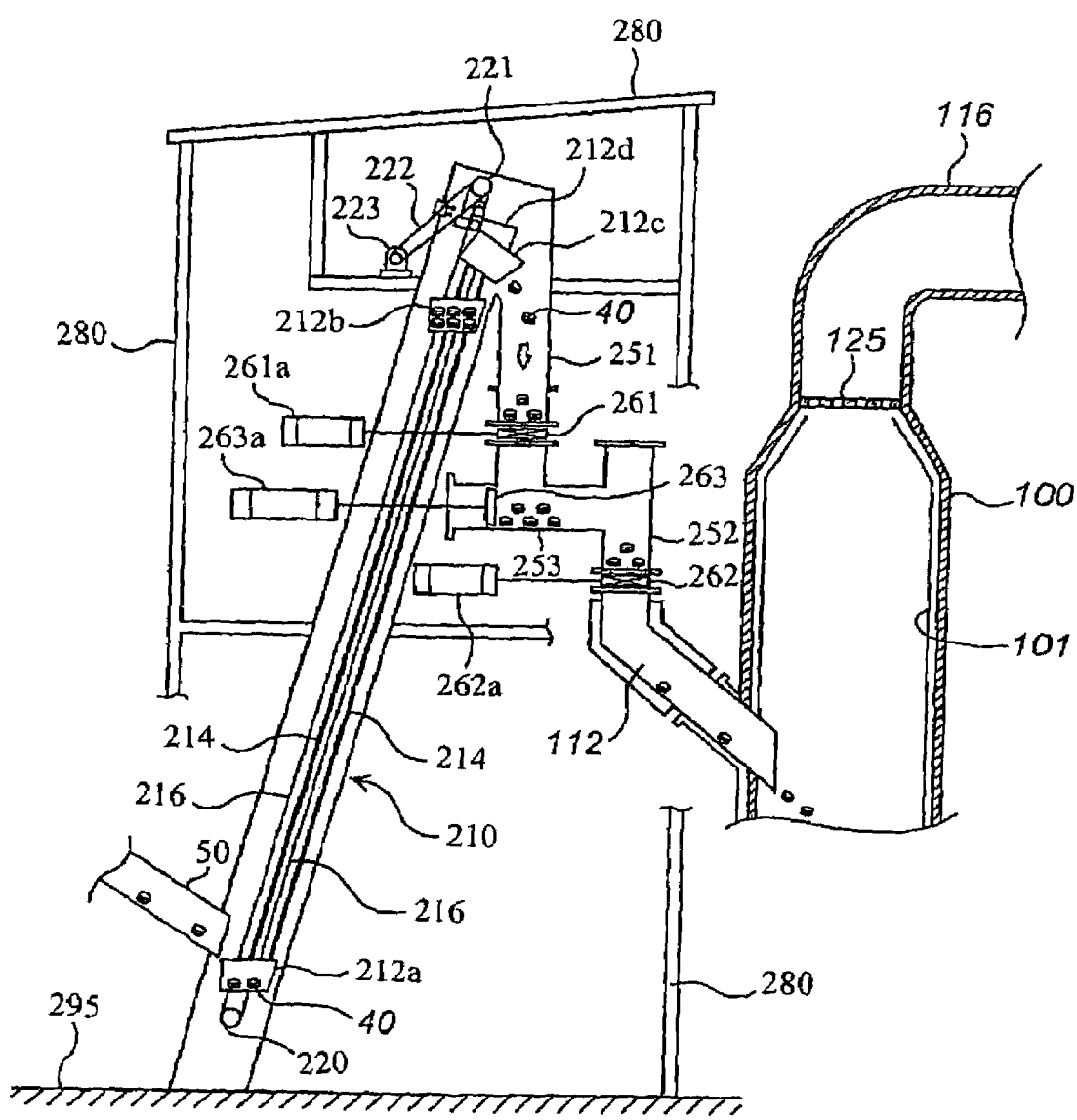
FIG. 3 is a conceptual diagram of an automatic charging system of inflators into a heat-treating tower.
Figure 4:
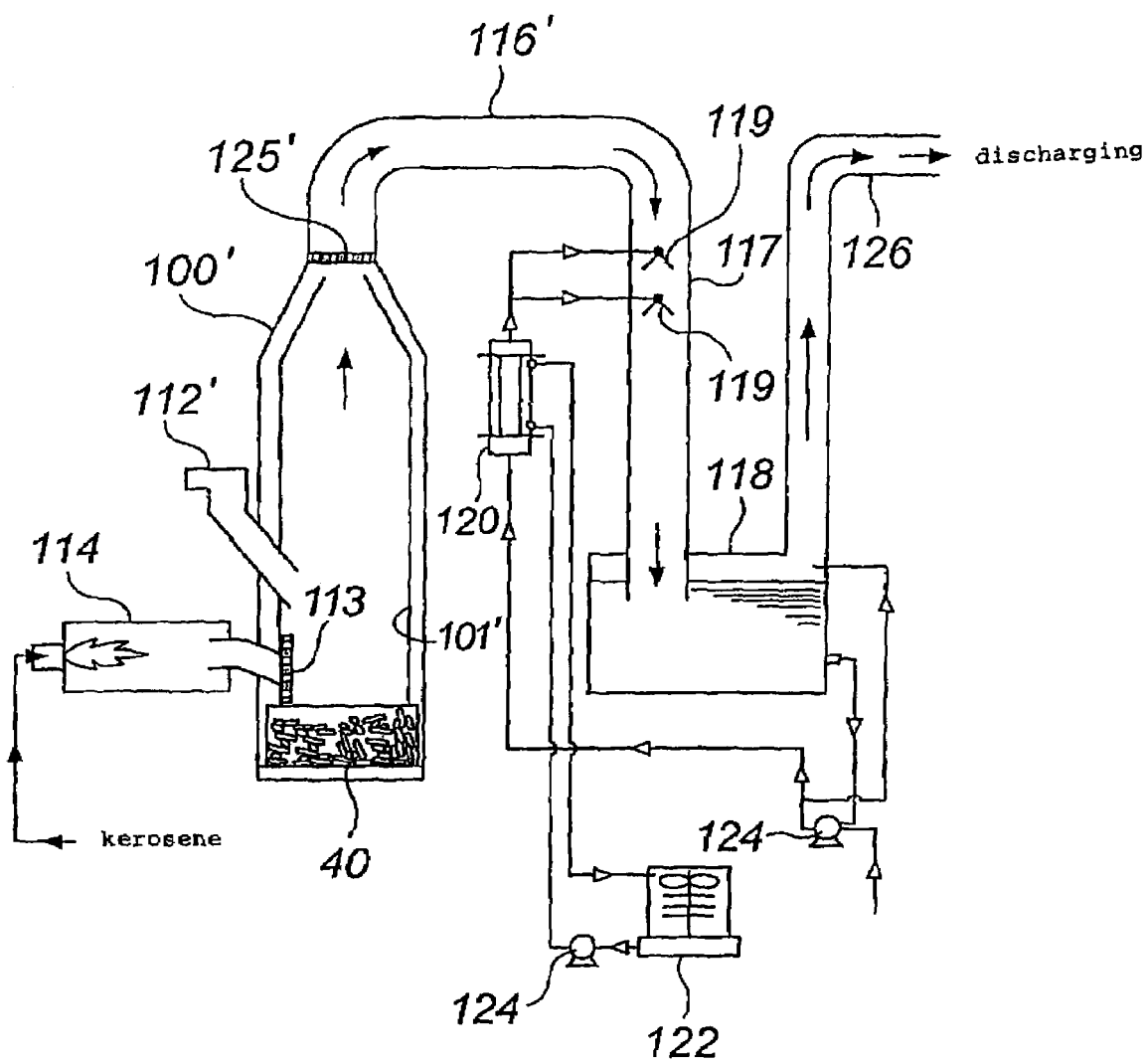
FIG. 4 is a conceptual diagram of a heat-treatment equipment for inflators.

The fixed quantity supply equipment 10 for inflators of the present invention is used by being assembled into an automatic charging system for a heat-treating tower for heat-treating inflators as shown in FIG. 3 or an inflator heat-treatment equipment as shown in FIG. 4.

FIG. 3 is a conceptual diagram of an automatic charging system of inflators into a heat-treating tower, in which an inflator conveying and discharging apparatus are combined with each other. FIG. 4 is a conceptual diagram showing an inflator heating treatment equipment. In this case, disk-like inflators 40 are shown in FIG. 3, and cylindrical inflators 40 are shown in FIG. 4.

As shown in FIG. 3, a bucket 212a is positioned at a lower end side of a tubular passage 210. Next, the predetermined number of inflators 40 are supplied from an inflator supplying port 50 into the bucket 212a. The tubular passage 210 is installed such that it is inclined to an installation surface 295 by a supporting structure body 280.

Thereafter, an upper gear wheel 221 is rotated according to an action of a driving chain 222 by activating a driving apparatus 223. A lower gear wheel 220 starts rotating according to rotation of the upper gear wheel 221, and a winding-up chain 216 spanned between the both gear wheels starts circulation. The bucket 212 ascends inside the tubular passage 210 along guide rails 214 due to the circulation of the winding-up chain 216, and it reaches the stop position indicated by numeral 212c via the positions indicated by reference numerals 212a and 212b.

At the stop position indicated by numeral 212c, two of four guide rails 214, which are positioned on the side of a first vertical passage 251, are bent in the direction of the first vertical passage 251. The two other guide rails 216 have no bent portion and they further extend upwardly. For this reason, a bottom portion of the bucket 212 connected to the winding-up chain 216 is pulled up to a stopper portion (not shown) installed at the uppermost portion. On the other hand, since an upper portion of the bucket connected to guide rollers inside the bent portions of the guide rails 214 moves along the bent portions of the guide rails 214, the bucket 212 tilts. The position of the stopper portion and the bent portions of the guide rails 214 are set such that the bucket 212 tilts by 90° (a state indicated by the numeral 212d) and all the inflators 40 inside the bucket 212 are discharged. For this reason, the bucket 212 is tilted as indicated by reference numerals 212c and 122d, the inflators 40 inside the bucket 212 are finally discharged into the first vertical passage 251.

Thereafter, the bucket 212 is returned to the position indicated by reference numeral 212a in the order reversed to the order at the ascending time, namely, via the positions indicated by reference numerals 212d, 212c, and 212b by circulating the winding-up chain 216 in the reversed direction, and a similar action is repeated.

The inflators 40 discharged inside the first vertical passage 251 stay therein, since a first opening/closing means 261 is closed.

Thereafter, when the first opening/closing means 261 is opened, the inflators fall onto a flat passage 253 and they stay there. Incidentally, the first opening/closing means 261 may be kept opened so that the inflators fall onto the flat passage 253 at one time. However, since an impact due to the falling is large and malfunction of the inflator(s) 40 may occur, it is preferable that the inflators 40 are once stopped at the position of the first opening/closing means 261. In this case, after the inflators 40 are fallen down to the flat passage 253, the opening/closing means 261 is closed.

Thereafter, the inflators 40 staying in the flat passage 253 fall down in a second vertical passage 252 by a moving means 263. At this time, the second opening/closing means 262 may be opened. However, it is desirable that the second opening/closing means is kept closed so that the inflator(s) 40 is not activated erroneously due to reception of heat from the heat-treating tower 100.

Thereafter, the second opening/closing means 262 is opened to charge the inflators 40 into heat-treating tower 100 through a inflator charging port 112. And then, such a series of actions is repeated.

The heat-treating tower 100 is provided with a metal partition wall 101 for protecting an inner wall of the heat-treating tower 100. An exhaust gas tube 116 for exhausting gas generated inside the heat-treating tower 100 is connected to an upper opening portion of the heat-treating tower 100. A partition means 125 (for example, made of a wire mesh, a punching metal, or a grating made of iron), which allows ventilation of the gas, is provided between the heat-treating tower 100 and the exhaust gas tube 116.

In the inflator charging apparatus, it is possible that only the first and second vertical passages (or the inclined passage) are provided without providing the flat passage, and that two opening/closing means are provided. However, from the viewpoint of relaxation of an impact due to falling-down of the inflators 40, it is desirable to employ a combination of the first vertical passage 251, the flat passage 253, and the second vertical passage 252.

The opening/closing states of the first opening/closing means 261 and the second opening/closing means 262 may be adjusted such that the inflators 40 inside the first vertical passage 251, the flat passage 253 and the second vertical passage 252 do not activate erroneously due to heat from the heat-treating tower 100. The reference numeral 261a denotes a seal valve for opening/closing the first opening/closing means 261, the reference numeral 262a denotes a seal valve for opening/closing the second opening/closing means, and the reference numeral 263a denotes a charging pusher for moving the moving means 263 forward and backward.

A heat-treating tower 100' as shown in FIG. 4 is attached with an inflator charging port 112' for charging inflators 40 which are subject to treatment and a combustion furnace (a burner) 114 for raising the temperature inside the heat-treating tower 100'. The combustion furnace 114 (the same combustion furnace as that disclosed in JP-A 11-101422 can be used) is supplied with kerosene as a fuel. The inflator charging port 112' can be connected with the automatic charging system of inflators into a heat-treating tower as shown in FIG. 3.

An exhaust gas tube 116' for exhausting a gas generated inside the heat-treating tower 100' is connected to an upper opening portion of the heat-treating tower 100'. A partition means which allows ventilation (for example, a wire mesh, a punching metal, or a grating made of iron) 125' is provided between the heat-treating tower 100' and the exhaust gas tube 116'. The partition means 125' is mounted removably by a bolt and a nut at a peripheral edge portion thereof and a flange portion provided on an inner wall surface of the heat-treating tower 100' or an inner wall surface of the exhaust gas tube 116'. A similar partition means 113 can also be mounted removably at an inlet of the combustion furnace 114.

A distal end of the exhaust gas tube 116' is connected to a cooling tower tank 118, and a gas passing through the interior of the exhaust gas tube 116' is washed and cooled by water sprays 119 of the cooling and washing tower 117 and it is discharged from a gas discharging tube 126 to the atmosphere via the cooling tower tank 118. The reference numeral 120 denotes a heat exchanger, reference numeral 122 denotes a cooling tower, and reference numeral 124 denotes a pump. In this case, a metal partition wall 101' functioning to protect an inner wall of the heat-treating tower 100' can be provided inside the heat-treating tower 100 similar to the one disclosed in FIG. 1 of JP-A 11-101422.

The fixed quantity supply equipment 10 for inflators is connected to a charging port of the inflator charging port 112'. At this time, the inflator charging port 112' may be utilized as the inclined tube 50 as shown in FIG. 1(*b*), or the inclined tube 50 may be connected to the inflator charging port 112'.

Next, an operation of the fixed quantity supply equipment 10 for inflators will be explained with reference to FIGS. 1(*a*), 1(*b*), and FIG. 2.

Eight disk-like inflators 40 are accommodated in each of the total number of 10 inflator accommodating chambers 20 provided in the annular main body 14.

By operating an unillustrated driving apparatus to rotate the supporting shaft 12, the annular main body 14 rotates on the annular guide rails at a predetermined speed. The annular main body 14 stops its rotation at the cut positions (the connection positions of the inclined tube 50) of the annular guide rail each time. Then, the bottom portion 22 of the inflator accommodating chamber 20 (the accommodating chamber 20 hatched in FIG. 1(*a*)) is opened by the opening/closing means 30. The rotating speed of the supporting shaft 12 is adjusted in relation to the treatment capacity in the inflator heat-treatment equipment.

When the bottom portion 22 is opened by the opening/closing means 30, the bottom portion 22 is opened according to actions of the pulling tool 46 interlocked with movement of the piston 34 and the opening/closing assistant tool 45 by retracting the piston 34 with the cylinder 32.

The inflators 40 inside the inflator accommodating chamber 20 fall down naturally according to opening of the bottom portion 22 to slide down inside the inclined tube 50 so that they are charged from the inflator charging port 112 into the heat-treating tower 100 (or 100').

When a system in which the inflators 40 falls naturally due to opening of the bottom portion 22 is applied in this manner, since the inflators 40 can be caused to fall and be discharged regardless of the accommodated state of the inflators 40 inside the inflator accommodating chamber 20, the accommodating work of inflators 40 can be made easy.

The bottom portion 22 of the inflator accommodating chamber 20 which has discharged the inflators 40 is immediately closed by the opening/closing means and new inflators 40 are accommodated from the opened ceiling portion. When the bottom portion 22 is closed by the opening/closing means 30, an operational procedure reversed to that at the opening time is employed.

Then, when the next inflator accommodating chamber 20 is positioned at a hatched portion as shown in FIG. 1(*a*), the bottom portion 22 of the inflator accommodating chamber 20 is opened by the opening/closing means 30, and similar actions are repeated thereafter.

The inflators 40 which are treatment subjects can be supplied in a fixed quantity to the heat-treating tower by such a series of actions.

The invention claimed is:

1. A fixed quantity supply equipment for inflators, adapted to be used in a system for charging inflators for an air bag into a heat-treating tower, for treating the inflators inside the heat-treating tower, comprising:
    a rotatable supporting shaft;
    a plurality of inflator accommodating chambers provided at a periphery of the supporting shaft, each inflator accommodating chamber having a part being formed openable/closable; and
    an opening/closing means for opening/closing said part of the inflator accommodating chambers.

2. A fixed quantity supply equipment for inflators according to claim 1, further comprising:
    an annular main body mounted integrally to the periphery of the supporting shaft, and the inflator accommodating chambers are formed by partitioning an interior of the annular main body, a bottom portion of said each inflator accommodating chamber is set openable/closable to form an inflator supplying port.

3. A fixed quantity supply equipment for inflators according to claim 1, further comprising:
    an annular main body mounted integrally to the periphery the supporting shaft, and the inflator accommodating chambers are formed by partitioning an interior of the annular main body into a plurality of chambers, a bottom portion of each inflator accommodating chamber is set openable/closable to form an inflator supplying port, and a portion the inflator accommodating chamber is opened to form an accommodating port for receiving the inflators in the inflator accommodating chamber.

4. A fixed quantity supply equipment for inflators according to claim 1 or 2, wherein the opening/closing means utilizes pneumatics.

5. A fixed quantity supply equipment for inflators according to claim 1 or 2, further comprising:
    an inclined tube for receiving the inflators inside the inflator accommodating chamber when the inflators are discharged from the inflator accommodating chamber.

6. A fixed quantity supply equipment for inflators according to claim 2, further comprising:
    an opening/closing assistant tool attached to the bottom portion;
    a pulling tool adapted to engage with the opening/closing assistant tool when the annular main body rotates to a predetermined position; and
    an actuator for moving the pulling tool when the annular main body rotates to a predetermined position, such that the pulling tool engages with the opening/closing assistant tool to open the bottom portion to discharge the inflators in the inflator accommodating chamber.

7. A fixed quantity supply equipment for inflators according to claim 6, wherein the pulling tool has a hook-like portion adapted engage with the opening/closing assistant tool when the annular main body rotates to the predetermined position.

* * * * *